April 16, 1957 L. T. WARD 2,788,925
METERING VALVE
Filed Aug. 16, 1954 2 Sheets-Sheet 1
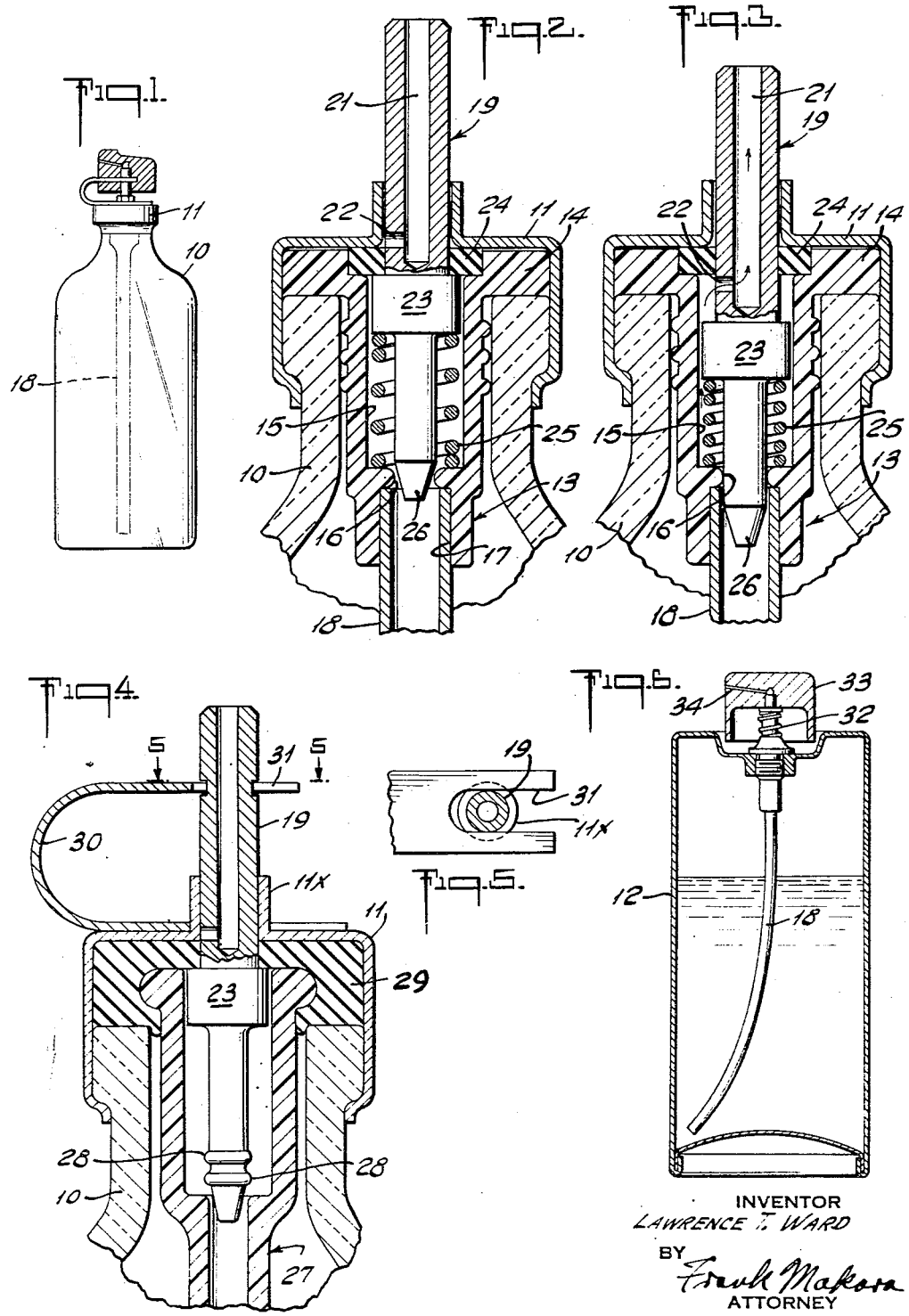
INVENTOR
LAWRENCE T. WARD
BY
Frank Makara
ATTORNEY

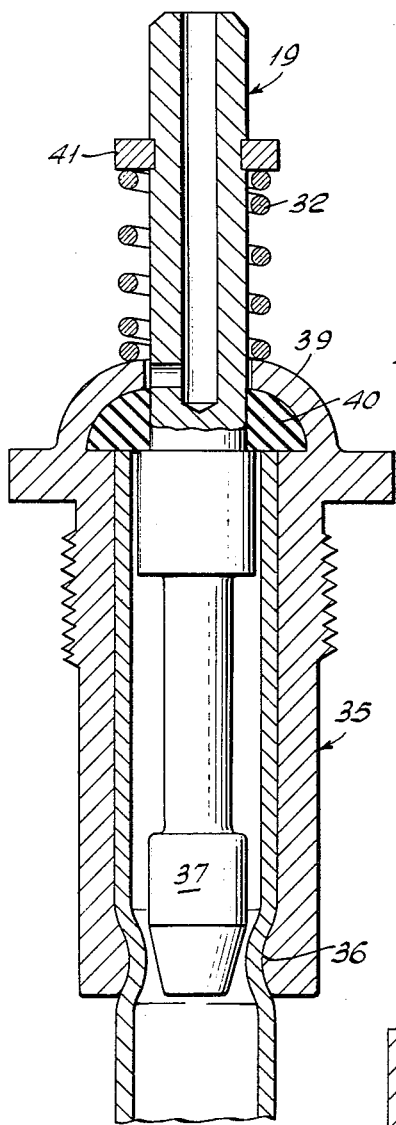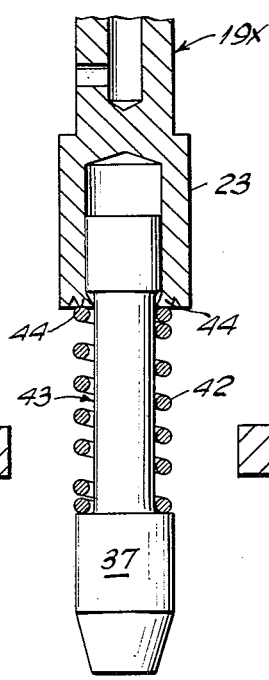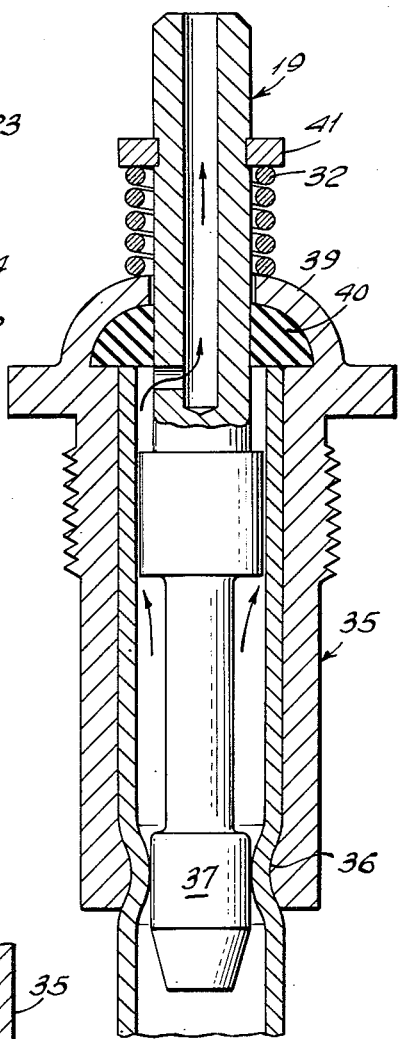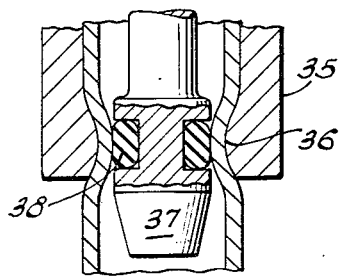
INVENTOR
LAWRENCE T. WARD
BY
Frank Makova
ATTORNEY

United States Patent Office 2,788,925
Patented Apr. 16, 1957

2,788,925

METERING VALVE

Lawrence T. Ward, Northampton County, Pa.

Application August 16, 1954, Serial No. 450,177

2 Claims. (Cl. 222—394)

This invention relates to a metering valve adapted to dispense a metered or definite amount of liquid and more particularly it relates to a metering spray valve adapted to dispense a low-boiling propellant-solvent.

It is an object of this invention to provide a metering spray valve adapted to dispense a metered amount of liquid propellant solution for each activation of the valve.

It is another object of this invention to provide a spray valve activated by a finger depressable valve plunger and adapted to dispense a metered amount of propellant for each activation.

It is another object of this invention to provide an intermittently operated metering valve.

It is another object of this invention to provide a valve adapted to spray a liquid propellant having dissolved therein a beneficial substance, said spray being of uniform substance concentration during its entire period of spray formation and, It is another object to provide a metering valve of inexpensive construction.

These and other objects of this invention will become evident upon reading the disclosure in conjunction with the illustrated embodiments shown in the drawing in which:

Fig. 1 is a side view of a metering valve secured to a glass bottle with a dip tube therein and having a U-shaped spring secured to a finger depressable plate shown in cross section.

Fig. 2 is a vertical section taken through the metering valve secured to a bottle shown broken away and having an internally disposed spring loaded plunger, Fig. 3 is a view similar to that of Fig. 2 but showing the valve parts disposed in the spray forming position, Fig. 4 is a vertical sectional view of a modified metering valve having non-metallic operative parts and adapted to dispense drug solutions free from metal contamination, Fig. 5 is a view taken on line 5—5 of Fig. 4, Fig. 6 is a vertical section view taken through a container secured to a metering valve having a syphon dip tube, Fig. 7 is a vertical section taken through a modified metering valve showing a syphon tube disposed in a valve housing, Fig. 8 is a section view similar to that of Fig. 7 but showing the valve plunger disposed during spray formation, Fig. 9 is a side view partly in section of a modified articulated valve plunger, and Fig. 10 is a section view showing a modified plunger terminus disposed in the inlet orifice leading to the metered reservoir.

The metering valve of this invention may be secured to a variety of pressure resistant liquid propellant containing containers.

Thus the valve may be secured to a glass container 10 by means of a rolled over collar 11, or the valve may be provided with screw threads adapted to engage the threads of a metal container 12 (Fig. 6).

The valve generally consists of a valve housing having a tubular conduit therethrough, a plunger disposed in part in said tubular housing conduit and in part outwardly of said valve housing and adapted to be operated reciprocally by finger pressure, a spring disposed coactingly with said plunger to urge said plunger away from the valve interior, and means disposed about the plunger top for effecting a gastight seal thereto.

Turning to Fig. 2 a modified tubular vlave housing 13, preferably made of easily cleanable material such as plastic, is provided with a flanged top lip 14 adapted to be seated on the rim of a narrow mouthed bottle 10. The tubular housing conduit consists of a well reservoir formed by housing wall 15, a throat 16 and a tubular cavity 17 adapted to receive syphon dip tube 18 made of plastic.

The plunger 19 is of unitary construction and is provided with a top section containing an axially disposed tubular conduit 21 communicating with a branch lateral conduit 22 leading to the exterior of the plunger, a middle section 23 having a diameter slightly less than the diameter of the well reservoir 15 to permit passage of fluid therebetween, said middle section being adapted to reciprocate in said reservoir of said housing, and a bottom section having an insertable conical terminus of smaller diameter than said middle section.

As shown in Fig. 9, a plunger 19x may be provided which consists of two separate parts, but in either event the principle of operation is substantially the same for both types of plungers.

Referring to Figs. 2 and 3 the plunger 19 is loosely fitted in the well cavity forming the reservoir and is retained therein by a sealer gasket ring 24 which engages the top plunger section in sliding relationship and forms a gas-tight seal with the outside walls of the top cylindrical tubular plunger portion and with the upper ledge of plunger middle section 23 to prevent loss of reservoir contents.

The bottom ledge of middle section 23 engages one end of a coil spring 25 (Figs. 2 and 3), the other end of which is seated upon the bottom apertured wall of the reservoir well cavity. The coil spring 25 is disposed about the lower section of the plunger and is adapted to normally urge the plunger upwardly to effect the gastight seal between the middle plunger section 23 and sealer gasket ring 24.

Still referring to Figs. 2 and 3 the bottom of the plunger is provided with a conical terminus 26 adapted to gradually cut-off the liquid propellant within the dip syphon tube 18 normally in continuous communication with the liquid propellant in the housing reservoir.

The aperture disposed in the bottom wall of the well cavity is preferably provided with a rounded edge to facilitate passage of liquid therebetween and is disposed adjacently to the plunger terminus 26.

In the operation of the valve of Figs. 2 and 3 the downward movement of the plunger against coil spring 25 causes the lateral conduit 22 to descend below sealer ring 24 and thus to be in communication with the reservoir cavity, thereby exposing the low-boiling propellant therein to evaporation and spray formation. Meanwhile the plunger terminus is so adjusted as to gradually close the reservoir inlet port leading to the dip tube 18, said gradual closing be effected by the conical plunger terminus coacting with the rounded edge of the inlet aperture to permit a sweeping out of the reservoir contents by the body of liquid propellant in the dip tube 18 and container 12.

Turning to Fig. 4, there is shown a modified valve having a bow-spring disposed exteriorly of the valve and container and adapted to engage the top plunger section in a manner to urge it continuously outwardly and out of the valve housing. In the modification of Fig. 4, the valve housing and dip tube preferably made of plastic constitute a single unitary structure resembling a thistle tube 27. This thistle tube housing is also provided with a rounded operating edge on the bottom cavity wall inlet aperture so that the principle of gradual closure permitting evacuation of the reservoir contents, described above, is also applicable to this modification. The plunger terminus of this modification (Fig. 4) is provided with one or more elevated ridges 28 adapted to effect an improved liquid tight seal upon closure of the inlet aperture.

This modification of Fig. 4, employs a large rubber or plastic sealer ring 29 adapted to be disposed between the top of the thistle tube housing and the bottle in a gas-tight manner and also adapted to engage the top of the middle plunger section 23 in a gas-tight manner to prevent any leakage of propellant. The sealer ring 29 is secured in place coactingly with the plunger, thistle tube and glass bottle container 10 by means of a rolled collar 11 of conventional structure and application. The bow-spring 30 is provided with a leg having a slot 31 (Fig. 5) to engage a suitably grooved channel disposed in the top plunger section and also the spring is provided with an aperture in the other leg to be disposed captively over collar upright section 11x (Fig. 4).

The externally disposed spring need not be bow-shaped since it may be a coil spring 32 (Figs. 6 to 8). The preferred manner of depressing the plunger employs a conventional finger depressable plate 33 having a laterally disposed spray conducting conduit 34 for directing a spray of drug containing propellant where needed, as for example into the throat of an oral cavity.

Turning now to the valve modification shown in Figs. 7 to 10, a metal valve housing 35 having screw threads thereon adapted to engage a metal container 12 (Fig. 6) is provided with a tubular cylindrical reservoir cavity having a bulbous ridge 36 forming a reservoir inlet orifice adjacent to the bottom end. The tubular cavity is of uniform diameter except where the bulbous ridge forms a constriction adapted to seat the valve plunger in a valve closing position.

A plastic or rubber resilient tube 18 of uniform diameter is inserted past the ridge 36 and completely into the well cavity of the valve housing. In this modification the plunger bottom 19 or 19x is provided with a bullet head 37 which may be provided with a sealer ring 38 (Fig. 10) of varying rectangular or round cross-section to effect an improved gas-tight seal.

The valve reservoir is located within the dip tube 18 in the modification of Figs. 8 to 10.

The valve housing 35 is provided with a top housing wall 39 which is turned or rolled over upon a sealer gasket ring 40 to give an appearance of an apertured dome. The spring 32 is disposed about the top plunger section and between the dome and a metal restraining ring 41 keyed into a suitable groove in said top plunger section.

Fig. 7 shows the valve in a closed or non-spray forming position whereas Fig. 8 shows the valve in the spray forming position. In this position the liquid propellant disposed in the reservoir is exposed to atmospheric pressure so that it partly vaporizes and is also swept out of the reservoir by the propellant molecules during the gradual cutting off of the previously continuous stream of liquid propellant established in and between the reservoir and the dip tube.

In the use of the plunger of Fig. 9, a plunger spring 42 is used. The spring 42 gives the plunger 19x an articulated effect since depressing the plunger 19x first compresses coil spring 32 and then when the bullet nose 37 is seated in the throat or inlet reservoir orifice formed by ridge 36 it is gradually inserted with a cushioned pressure of increasing force due to the secondary compression of coil spring 42 and the movement of the separate and moveable plunger rod 43 into a cavity provided in middle plunger section 23. The plunger rod 43 is held captively in its respective cavity by means of peened over lugs 44.

Other modifications are possible in view of this generic teaching but all these modifications fall within the generic scope of the metering valve having a finger depressable plunger of this invention and are intended to be covered by the claims appearing hereinafter.

I claim:

1. A spray valve for bottles having a bottle neck comprising a resilient tubular valve housing having a top centrally disposed cavity, a centrally apertured transverse wall at the bottom of said cavity and a bottom cavity below said transverse wall, said housing having an integral circular flange at its top adapted to seat against the bottle top in a gas tight manner, said top cavity having an annular channel, said bottom cavity of said housing being suitable for engaging frictionally a syphon tube; a coil spring disposed in said housing and upon said transverse wall; an integral plunger having a top tubular cylindrical portion having a side opening leading to the base of the tubular portion, a middle cylindrical portion of enlarged diameter and having a top annular horizontal shelf, and a solid bottom cylindrical portion having a conical terminus, said bottom portion being disposed in said coil spring with the terminus thereof disposed in said transverse wall aperture in non-tilting space relationship, said middle plunger portion being disposed in said top housing cavity in suitable space relationship to permit passage of liquid therebetween, and a resilient sealer ring disposed around said top plunger portion and on said channel shelf of said housing in gas tight sliding relationship against the plunger and gas tight stationary relationship against said housing, said top shelf of said middle portion of said plunger being urged continuously by said coil spring to effect a gas tight contact between said middle portion shelf and said sealer ring, whereby downward movement of said plunger first effects a cutting off of liquid communication between the top housing cavity and the bottom housing cavity and the syphon tube therein by frictional engagement of the bottom portion plunger wall with the aperture wall of the transverse wall with breaking of contact between said shelf of said middle plunger portion and said sealer ring and further downward movement of the plunger pushes the side opening of said tubular portion below said sealer ring, thereby engaging the top cavity of said housing.

2. The combination of a bottle having a circular mouth and the valve of claim 1 disposed in the bottle mouth and an integral cylindrical ferrule having a vertical section engaging the bottle mouth in locking relationship and having a horizontal circular section integral with said vertical section for press fit engagement with said sealer ring thereby assuring a gas tight engagement of said sealer ring to said housing and said plunger.

References Cited in the file of this patent

UNITED STATES PATENTS

| | | |
|---|---|---|
| 2,545,991 | Cooper | Mar. 20, 1951 |
| 2,667,991 | Boyer | Feb. 2, 1954 |
| 2,701,163 | Teller | Feb. 1, 1955 |
| 2,746,796 | St. Germain | May 22, 1956 |